US008667529B2

(12) United States Patent
Taxier (10) Patent No.: US 8,667,529 B2
(45) Date of Patent: Mar. 4, 2014

(54) PRESENTATION OF AUDIOVISUAL EXERCISE SEGMENTS BETWEEN SEGMENTS OF PRIMARY AUDIOVISUAL CONTENT

(75) Inventor: Karen Michelle Taxier, Highlands Ranch, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 0 days.

(21) Appl. No.: 13/543,993

(22) Filed: Jul. 9, 2012

(65) Prior Publication Data
US 2014/0013344 A1  Jan. 9, 2014

(51) Int. Cl.
*H04N 7/10* (2006.01)
*H04H 60/33* (2008.01)
*G06Q 30/00* (2012.01)
*A63B 71/00* (2006.01)

(52) U.S. Cl.
USPC ................. 725/34; 725/10; 705/14.66; 482/8

(58) Field of Classification Search
None
See application file for complete search history.

(56) References Cited

U.S. PATENT DOCUMENTS

| 6,698,020 | B1 * | 2/2004 | Zigmond et al. | 725/34 |
| 2002/0013943 | A1 * | 1/2002 | Haberman et al. | 725/39 |
| 2002/0056107 | A1 * | 5/2002 | Schlack | 725/46 |
| 2006/0174260 | A1 * | 8/2006 | Gutta | 725/13 |
| 2006/0184427 | A1 * | 8/2006 | Singh | 705/26 |
| 2007/0111858 | A1 * | 5/2007 | Dugan | 482/8 |
| 2008/0103023 | A1 * | 5/2008 | Chung et al. | 482/3 |
| 2008/0127247 | A1 * | 5/2008 | Allen et al. | 725/32 |
| 2010/0188405 | A1 * | 7/2010 | Haughay et al. | 345/440 |
| 2011/0093884 | A1 * | 4/2011 | Wachtfogel et al. | 725/31 |
| 2012/0109726 | A1 * | 5/2012 | Ruffini | 705/14.4 |

OTHER PUBLICATIONS

Nintendo Wii Fit Game Overview, May 21, 2008 (Release Date), http://www.nintendo.com/games/detail/hoiNtus4JvIcPtP8LQPyud4Kyy393oep.*

* cited by examiner

*Primary Examiner* — Scott Beliveau
*Assistant Examiner* — Cynthia Fogg
(74) *Attorney, Agent, or Firm* — Ingrassia Fisher & Lorenz, P.C.

(57) ABSTRACT

A method of operating a video services system is presented here. The method presents an audiovisual stream to a user of a video services receiver. The audiovisual stream includes a first segment of primary audiovisual content, a second segment of primary audiovisual content, and a segment of secondary audiovisual content between the first segment of primary audiovisual content and the second segment of primary audiovisual content. The method continues by detecting presentation of the segment of secondary audiovisual content, obtaining a segment of audiovisual exercise content at the video services receiver, and presenting the segment of audiovisual exercise content concurrently with the segment of secondary audiovisual content.

18 Claims, 5 Drawing Sheets

PRESENTATION OF AUDIOVISUAL EXERCISE SEGMENTS BETWEEN SEGMENTS OF PRIMARY AUDIOVISUAL CONTENT

TECHNICAL FIELD

Embodiments of the subject matter described herein relate generally to content delivery systems such as satellite video systems. More particularly, embodiments of the subject matter relate to a video services receiver (such as a set-top box) that provides audiovisual content to encourage, guide, promote, or instruct the user in a manner intended to result in physical activity.

BACKGROUND

Most television viewers now receive their video signals through a content aggregator such as a cable or satellite television provider. In a typical scenario, encoded audio/video signals are sent via a cable or wireless data link to the viewer's home, where the signals are ultimately decoded in a set-top box (STB) or other consumer device. The decoded signals can then be viewed on a television or other appropriate display as desired by the viewer. Most video service providers include commercials, advertisements, and/or marketing content interspersed between segments of program content, as is well understood.

A practical implementation of an STB may include or cooperate with a digital video recorder (DVR) that is designed to record video, audio, and/or audiovisual programs received by the STB. The user can then play recorded programs at any convenient time. In accordance with typical and conventional digital recording techniques, commercials, advertisements, and other secondary forms of content are recorded when a live program broadcast is recorded.

Television systems and monitors may also be used for video gaming. The genre of exercise/fitness related video games is becoming popular as more users become aware of the benefits of physical activity. Such video games introduce a level of physical activity to the game playing scenarios in an attempt to physically engage the user. Exercise related video games, however, are usually played in a focused and devoted manner that is unrelated to the viewing of broadcast programming.

Accordingly, it is desirable to have a video services system that delivers video programming and content in addition to exercise related content that promotes, encourages, or instructs physical activity or exercise between segments of program content. In addition, it is desirable to present the exercise related audiovisual content in a manner that does not obscure or replace the advertisement or commercial content that is normally delivered between the segments of program content. Furthermore, other desirable features and characteristics will become apparent from the subsequent detailed description and the appended claims, taken in conjunction with the accompanying drawings and the foregoing technical field and background.

BRIEF SUMMARY

A method of operating a video services system is presented here. The method maintains a library of available audiovisual exercise segments, and presents an audiovisual stream to a user of a video services receiver. The audiovisual stream includes a first segment of primary audiovisual content, a second segment of primary audiovisual content, and a segment of secondary audiovisual content between the first segment of primary audiovisual content and the second segment of primary audiovisual content. The method continues by obtaining user data that identifies the user of the video services receiver, acquiring a time duration of the segment of secondary audiovisual content; and selecting, from the library of available audiovisual exercise segments, a user-specific audiovisual exercise segment. The selection is influenced by the user data and the time duration. The method continues by presenting the selected user-specific audiovisual exercise segment concurrently with the segment of secondary audiovisual content.

Also provided is another exemplary embodiment of a method of operating a video services system. The method begins by presenting an audiovisual stream to a user of a video services receiver, the audiovisual stream comprising a first segment of primary audiovisual content, a second segment of primary audiovisual content, and a segment of secondary audiovisual content between the first segment of primary audiovisual content and the second segment of primary audiovisual content. The method continues by detecting presentation of the segment of secondary audiovisual content and, in response to the detection, obtaining a segment of audiovisual exercise content at the video services receiver. The method continues by presenting the segment of audiovisual exercise content concurrently with the segment of secondary audiovisual content.

A video services receiver for providing audiovisual content to a user is also provided. The video services receiver includes a receiver interface to receive an audiovisual stream having a first segment of primary audiovisual content, a second segment of primary audiovisual content, and a segment of secondary audiovisual content between the first segment of primary audiovisual content and the second segment of primary audiovisual content. The receiver also includes a data storage element to store a library of available audiovisual exercise segments, and a processor coupled to the receiver interface, the data storage element, and the display interface. The display interface is for a display operatively coupled to the video services receiver, and the display interface facilitates presentation of the audiovisual stream and segments of audiovisual exercise content on the display. The processor selects, from the library of available audiovisual exercise segments, a segment of audiovisual exercise content, and initiates presentation of the selected segment of audiovisual exercise content concurrently with the segment of secondary audiovisual content.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The exemplary embodiments described below relate to a video delivery system such as a satellite television system. The disclosed subject matter relates to a methodology that is intended to motivate, encourage, or otherwise prompt users to participate in physical activity while viewing audiovisual programming provided by the video delivery system. More specifically, the disclosed subject matter relates to the management, processing, and handling of audiovisual exercise segments that can be presented to the user of a video services receiver (e.g., a set top box) at appropriate times. For example, an exercise segment can be presented during a commercial break such that the user is encouraged to stand up and participate in some form of physical activity, which may be instructed or guided by the exercise segment. In certain embodiments, the exercise segment is presented concurrently with any secondary or interstitial content that is delivered between segments of primary video content. Thus, advertisements or commercials remain intact and are presented with the exercise segments.

Figure 1:
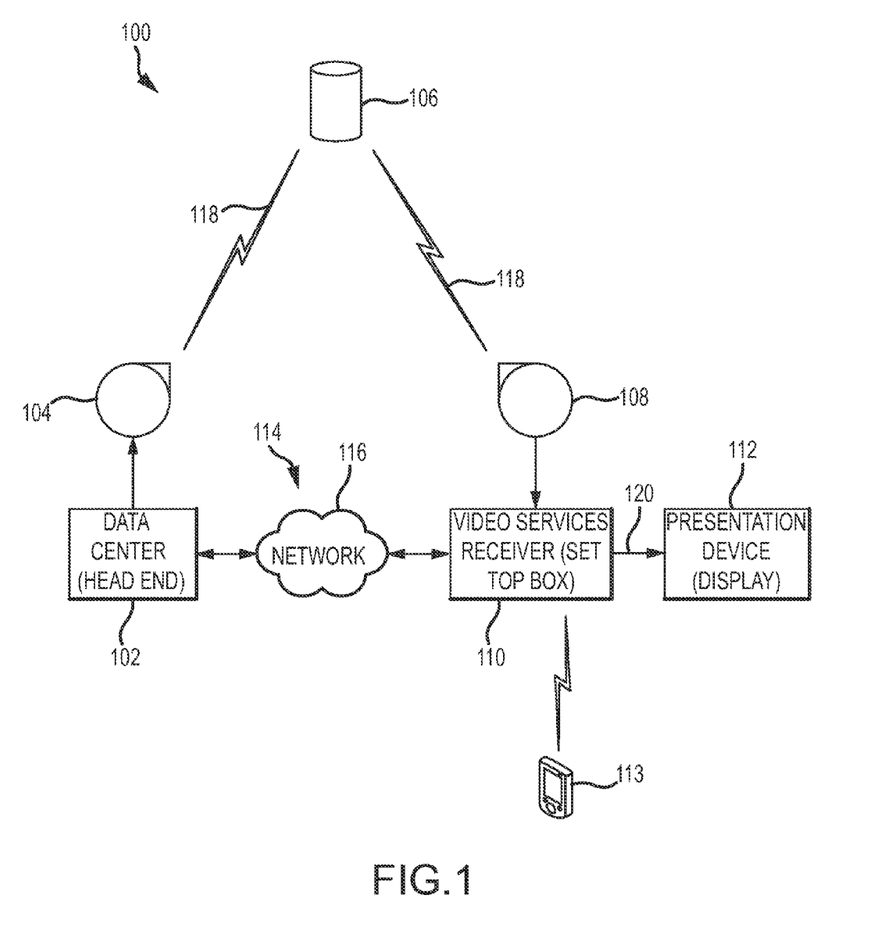
FIG. 1 is a schematic representation of an embodiment of a video services broadcasting system.

Turning now to the drawings, FIG. 1 is a schematic representation of an embodiment of a video services system 100 that is suitably configured to support the techniques and methodologies described in more detail below. This particular embodiment of the video services system 100 utilizes satellite-based data delivery. It should be appreciated that the techniques and methodologies described here could also be implemented using other data delivery systems, such as a cable delivery system, a fiber optic delivery system, or the like.

The system 100 (which has been simplified for purposes of illustration) generally includes, without limitation: a data center 102; an uplink transmit antenna 104; a satellite 106; a downlink receive antenna 108; a video services receiver 110 or other customer equipment; and a presentation device, such as a display device 112. In typical deployments, the video services receiver 110 can be remotely controlled using a wireless remote control device 113. In certain embodiments, the data center 102 communicates with the video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

The data center 102 may be deployed as a headend facility and/or a satellite uplink facility for the system 100. The data center 102 generally functions to control content, signaling data, programming information, and other data sent over a high-bandwidth link 118 to any number of downlink receive components (only one downlink receive antenna 108, corresponding to one customer, is shown in FIG. 1). In practice, the data center 102 may also provide content and data associated with audiovisual exercise segments for use with the video services receiver 110. Moreover, the data center 102 may also provide metadata that describes or is otherwise related to primary video content (e.g., program events), secondary or interstitial video content (e.g., commercials or advertisements), and/or audiovisual exercise segments, wherein the video services receiver 110 can receive and process the metadata as needed to support the functionality described in more detail below. In the embodiment shown in FIG. 1, the high-bandwidth link 118 is a direct broadcast satellite (DBS) link that is relayed by the satellite 106, although equivalent embodiments could implement the high-bandwidth link 118 as any sort of cable, terrestrial wireless and/or other communication link as desired.

The data center 102 includes one or more conventional data processing systems or architectures that are capable of producing signals that are transmitted via the high-bandwidth link 118. In various embodiments, the data center 102 represents a satellite station or other content distribution center having: a data control system for controlling content, signaling information, blackout information, programming information, metadata, and other data; and an uplink control system for transmitting content, signaling information, blackout information, programming information, metadata, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on the high-bandwidth link 118 in any manner. In the exemplary embodiment illustrated in FIG. 1, the uplink transmit antenna 104 is able to transmit data to the satellite 106, which in turn uses an appropriate transponder for repeated transmission to the downlink receive antenna 108.

Under normal operating conditions, the satellite 106 transmits content, signaling data, blackout information, programming data, metadata, and other data to the downlink receive antenna 108, using the high-bandwidth link 118. In practical embodiments, the downlink receive antenna 108 represents the customer's satellite dish, which is coupled to the video services receiver 110. The video services receiver 110 can be realized as any device, system or logic capable of receiving signals via the high-bandwidth link 118 and the downlink receive antenna 108, and capable of providing demodulated content to a customer via the display device 112.

The display device 112 may be, without limitation: a television set; a monitor; a computer display; or any suitable customer appliance with compatible display capabilities. In various embodiments, the video services receiver 110 is a conventional set-top box commonly used with DBS or cable television distribution systems. In other embodiments, however, the functionality of the video services receiver 110 may be commonly housed within the display device 112 itself. In still other embodiments, the video services receiver 110 is a portable device that may be transportable with or without the display device 112. The video services receiver 110 may also be suitably configured to support broadcast television reception, video game playing, personal video recording and/or other features as desired.

During typical operation, the video services receiver 110 receives programming (such as broadcast events, which may include segments of primary content interspersed with segments of secondary content), signaling information, exercise programming, and/or other data via the high-bandwidth link 118. The video services receiver 110 then demodulates, decompresses, descrambles, and/or otherwise processes the received digital data, and then converts the received data to suitably formatted video signals 120 that can be rendered for viewing by the customer on the display device 112. For the implementation described here, the video services receiver 110 includes or cooperates with a recording module (e.g., a DVR module) that records received programming for time-shifted playback. The recorded program events may include any combination of audio programs, video programs, audiovisual programs, or the like. Additional features and functions of the video services receiver 110 are described below with reference to FIG. 2.

The system 100 includes one or more speakers, transducers, or other sound generating elements or devices that are utilized for playback of sounds during operation of the system 100. These sounds may be, without limitation: the audio portion of a video channel or program; the content associated with an audio-only channel or program; audio related to the presentation of exercise segments; confirmation tones generated during operation of the system; alerts or alarm tones; or the like. Depending upon the embodiment, the system 100 may include a speaker (or a plurality of speakers) attached to, incorporated into, or otherwise associated with the display device, the video services receiver 110, the remote control device 113, and/or a home theater, stereo, or other entertainment system provided separately from the system 100.

Figure 2:
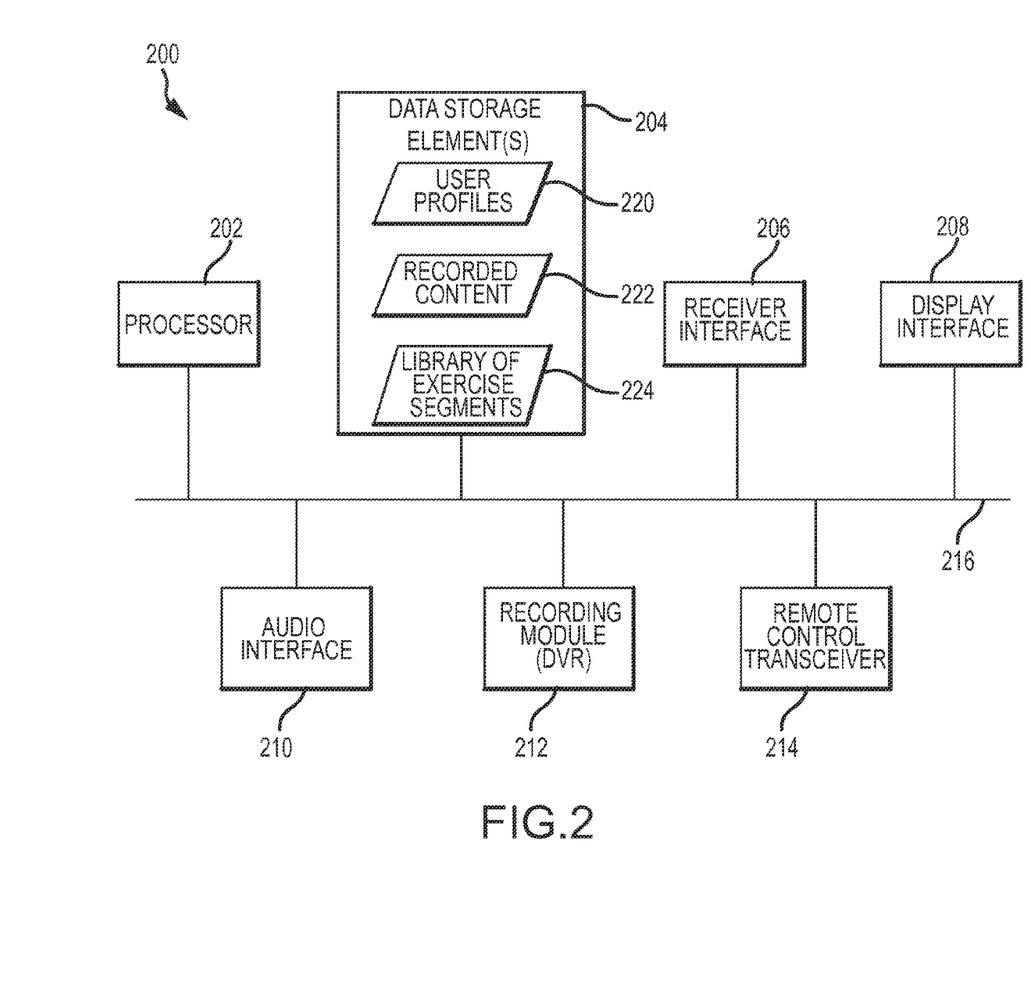
FIG. 2 is a schematic representation of an embodiment of a video services receiver suitable for use in the video services broadcasting system shown in FIG. 1.

FIG. 2 is a schematic representation of an embodiment of a video services receiver 200 suitable for use in the video services system 100 shown in FIG. 1. The video services receiver 200 is designed and configured to provide recorded and non-recorded content to a user, by way of one or more presentation devices. The recorded and non-recorded content may include primary audiovisual content, secondary audiovisual content that is provided between segments of the primary audiovisual content, segments of audiovisual exercise content, and the like. Accordingly, the video services receiver 200 can be used to receive program content, record program content, and present recorded and non-recorded program content to an appropriate display for viewing by a customer or user. As used herein, "primary audiovisual content" refers to the intended, desired, or selected program event, program, show, movie, episode, etc., while "secondary audiovisual content" refers to any content that might be inserted or otherwise interspersed between segments of the primary audiovisual content during live broadcast presentation, on-demand presentation, the presentation of recorded content, or the like. Thus, primary audiovisual content may include a movie, a network program, a sporting event, a concert, a news program, or the like. In contrast, secondary audiovisual content may include commercials, marketing content, promotional content, advertisements, short programs, or any other material that might be presented between segments of primary audiovisual content, before the start time of primary audiovisual content, and/or after the end time of primary audiovisual content.

Moreover, "audiovisual" is used here in a general sense, and "audiovisual content" is intended to include audio-only content, video-only content, a series or sequence of still images, or any combination thereof. Accordingly, although primary audiovisual content will typically represent a program event that includes a video component and a corresponding audio soundtrack, such content need not always include both audio and video components. For example, a music or radio channel of a video services system may include little to no video content. Nonetheless, the audio content provided by such a channel is still regarded as audiovisual content for purposes of this description.

This illustrated embodiment of the video services receiver 200 generally includes, without limitation: at least one processor 202; at least one data storage element 204 having a suitable amount of memory associated therewith; a receiver interface 206; a display interface 208 for a display; an audio interface 210; a recording module 212; and a remote control transceiver 214. These components and elements may be coupled together as needed for purposes of interaction and communication using, for example, an appropriate interconnect arrangement or architecture 216. It should be appreciated that the video services receiver 200 represents a "full featured" embodiment that supports various features described herein. In practice, an implementation of the video services receiver 200 need not support all of the enhanced features described here and, therefore, one or more of the elements depicted in FIG. 2 may be omitted from a practical embodiment. Moreover, a practical implementation of the video services receiver 200 will include additional elements and features that support conventional functions and operations.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as a microprocessor, a controller, a microcontroller, or a state machine. Moreover, the processor 202 may be implemented as a combination of computing devices, e.g., a combination of a digital signal processor and a microprocessor, a plurality of microprocessors, one or more microprocessors in conjunction with a digital signal processor core, or any other such configuration.

The data storage elements 204 may be realized using any number of devices, components, or modules, as appropriate to the embodiment. Moreover, the video services receiver 200 could include data storage elements 204 integrated therein and/or data storage elements 204 operatively coupled thereto, as appropriate to the particular embodiment. In practice, a data storage element 204 could be realized as RAM memory, flash memory, EPROM memory, EEPROM memory, registers, a hard disk, a removable disk, or any other form of storage medium known in the art. In certain embodiments, the data storage elements 204 include a hard disk, which may also be used to support integrated DVR functions of the video services receiver 200. The data storage elements 204 can be coupled to the processor 202 such that the processor 202 can read information from, and write information to, the data storage elements 204. In the alternative, the data storage elements 204 may be integral to the processor 202. As an example, the processor 202 and a data storage element 204 may reside in a suitably designed ASIC.

As depicted in FIG. 2, the data storage elements 204 can be used to store and maintain information for use by the video services receiver 200. For example, the data storage elements 204 may be used to obtain and store user profiles 220 for a plurality of different users of the video services receiver 200, recorded content 222 such as broadcast program events that include primary audiovisual content and/or secondary audiovisual content, and a library of available audiovisual exercise segments 224, programs, routines, or content. Of course, the data storage elements 204 may also be used to store additional data as needed to support the operation of the video services receiver 200.

A user of the video services receiver 200 may have a respective user profile 220 that is utilized to maintain user-specific data or information for that particular user (or group of users). For example, each of the user profiles 220 includes, defines, or is otherwise associated with at least one exercise regimen, program, schedule, or routine for the respective user. Accordingly, each of the user profiles 220 may be linked to a user by way of a username, a password, user credentials, an identification code, or any suitably formatted user data that uniquely identifies the user within the domain of users supported by the video services receiver 200. A user profile 220 may also include, define, or indicate certain user-specified preferences, options, or settings that influence the operation of the video services receiver 200. For example, a user profile 220 may specify the desired types or forms of exercise or physical activity for the user. As another example, a user profile 220 may specify or define a level of intensity, a number of exercise or movement repetitions, or other information that relates to the amount or frequency of exercise to be performed. As yet another example, a user profile 220 may allow the user to specify when he or she desires to be presented with exercise segments. In this regard, the user may choose to block the presentation of exercise segments during prime time, selectively allow the presentation of exercise segments only during weekday mornings, or the like. A user profile 220 may also be employed to maintain user performance data for the user, where such user performance data indicates an amount of physical activity completed by the user at times when exercise content is being presented. In this regard, the user profile 220 may include historical exercise performance data that can be accessed by the user and/or utilized by the system to dynamically update the exercise regimen for the user in an ongoing manner. A user profile 220 may also indicate the age, sex, physical fitness level, height, weight, and/or other physiological characteristics or traits of the user, and such information may be leveraged by the video services system to provide suitable audiovisual exercise content in the manner described in more detail below.

The recorded content 222 may be, without limitation: a recorded audio-only program (such as a recorded radio program or a recorded music channel); a recorded video-only or image-only program; a recorded program that conveys both audio and video or image content; or the like. In practice, the recorded content 222 can be formatted, handled, and stored in accordance with well-known and conventional DVR techniques and methodologies.

An exercise regimen includes or identifies one or more segments of audiovisual exercise content that is suitable or appropriate for the particular user of the video services receiver 200. For example, one user of the video services receiver may prefer an exercise regimen that includes exercise segments that depict, instruct, or show yoga poses, while another user may prefer an exercise regimen that includes exercise segments that depict, demonstrate, or encourage sit-ups, push-ups, jumping jacks, and other callisthenic activities. Yet another user may prefer an exercise regimen that includes exercise segments that depict, guide, or demonstrate dancing, running in place, and stretching. It should be appreciated that any type of exercise regimen could be supported by the video services receiver 200, and that the particular examples provided here are not intended to limit or otherwise restrict the scope or application of the described subject matter. Moreover, any number of exercise regimens could be included with or identified by a user profile 220 for a given user of the video services receiver 200.

As explained above, an exercise regimen may include or be defined by any number of audiovisual exercise segments that are suitably formatted for presentation by the video services receiver 200. The audiovisual exercise segments handled by the video services receiver 200 may be stored and maintained in the data storage elements 204 (as depicted in FIG. 2) and/or in one or more remote data storage elements (not shown). For example, one or more audiovisual exercise segments may be stored in a network server for delivery to the video services receiver as needed. In an alternative embodiment, one or more audiovisual exercise segments are provided with the video stream that conveys the primary and secondary video content, and the exercise segments are temporarily stored at the data storage elements 204. An audiovisual exercise segment could also be "locally" transferred to the video services receiver 200 via a data communication cable (e.g., a USB cable), a short range wireless communication technology (e.g., BLUETOOTH or Wi-Fi wireless communication), an infrared data communication link, an optical disk drive, or the like. In certain exemplary embodiments, the data storage elements 204 maintain the library of available exercise segments 224, which includes all of the different exercise segments 224 that are currently available for presentation at the video services receiver 200. In practice, the library of available exercise segments 224 is able to support the different exercise regimens for the various users of the video services receiver 200.

An audiovisual exercise segment may be realized as digital data that represents video only, audio only, video with corresponding audio, a sequence of still images (with or without audio), or the like. The time duration of an audiovisual exercise segment may be fixed, variable, or dynamically adjustable as needed. In practice, the content of an audiovisual exercise segment may include or convey, without limitation: a video tutorial or demonstration of exercise or physical activity; a series of still images that illustrate poses or physical movements to be followed by the viewer; an initial screen shot that includes written instructions related to exercise or physical activity, followed by an audio clip or a video clip; an audio clip that provides instructions or guidance to the user (e.g., "do twenty sit-ups during the next commercial break"); an audible metronome to assist the user with timing of exercise repetitions; or the like.

Although not always required, the library of available exercise segments 224 may include one or more exercise segments that have some relationship or correlation with the content of the video stream currently being presented by the video services receiver 200. In this regard, an audiovisual exercise segment may be associated with the primary audiovisual content and/or the secondary audiovisual content, as desired for the particular embodiment. For example, if the primary audiovisual content is an action movie that portrays a relatively high amount of physical activity, then it may be desirable to have at least some relatively strenuous or rigorous audiovisual exercise segments at the ready in the library of available exercise segments. As another example, if the secondary audiovisual content is a commercial for a dancing competition, then it may be desirable to have at least some dance related audiovisual exercise segments ready for presentation. As yet another example, if the primary audiovisual content is a cartoon or a program intended for children, then it may be desirable to have at least some fun, easy to understand, and/or animated exercise segments ready for presentation. Moreover, the genre, category, parental rating, and/or other metadata that describes the primary or secondary audiovisual content could be used to determine the particular exercise segments maintained in the library of available exercise segments 224.

In certain embodiments, the library of available exercise segments 224 may include one or more user-defined or user-recorded exercise segments. For example, the video services receiver 200 may allow users to configure and create customized exercise segments and/or exercise regimens using native functionality of the video services receiver 200. Similarly, the video services receiver 200 may allow users to configure and customize "stock" or "canned" exercise segments if so desired. For instance, it may be desirable to allow a user to modify certain characteristics of a baseline exercise segment, e.g., the exercise time duration, the number of repetitions to complete, the time between repetitions, the background music or soundtrack, the manner in which the exercise instructions are presented, etc. Moreover, the video services receiver 200 may allow users to record and upload personal video clips for storage in the library of available audiovisual exercise segments 224.

The receiver interface 206 is coupled to the customer's satellite antenna, and the receiver interface 206 is suitably configured to receive and perform front end processing on signals transmitted by satellite transponders. In this regard, the receiver interface 206 can receive data associated with any number of services (e.g., video services), including video streams that include or represent primary audiovisual content, secondary audiovisual content, audiovisual exercise segments, and the like. The data received and processed by the receiver interface 206 may also include metadata related to the audiovisual content, on-screen menus, GUIs, interactive programming interfaces, etc. The receiver interface 206 may leverage conventional design concepts that need not be described in detail here.

The display interface 208 is operatively coupled to one or more display elements (not shown) at the customer site. The display interface 208 represents the hardware, software, firmware, and processing logic that is utilized to render graphics, images, video, and other visual indicia on the customer's display. In this regard, the display interface 208 facilitates the presentation of video streams, programs, and exercise segments on the display(s) at the customer premises. For example, the display interface 208 is capable of providing primary audiovisual content, secondary audiovisual content, audiovisual exercise segments, graphical interactive programming interfaces for video services, interactive listings of recorded programs, interactive graphical menus, and other GUIs for display to the user. The display interface 208 may leverage conventional design concepts that need not be described in detail here.

The audio interface 210 is coupled to one or more audio system components (not shown) at the customer site. The audio interface 210 represents the hardware, software, firmware, and processing logic that is utilized to generate and provide audio signals associated with the operation of the video services receiver 200. Depending upon the particular embodiment, the audio interface 210 may be tangibly or wirelessly connected to the audio portion of a television or monitor device, or it may be tangibly or wirelessly connected to a sound system component that cooperates with the television or monitor device.

The recording module 212 is operatively coupled to the receiver interface 206 to record program events provided by the incoming services. In practice, the recording module 212 may include, cooperate with, or be realized as hardware, software, and/or firmware that is designed to provide traditional DVR features and functions for the video services receiver 200. Accordingly, the recording module 212 may record video programs provided by video services, audio-only programs provided by audio services, or the like. As mentioned above, the recording module 212 cooperates with the data storage elements 204 to store the recorded content 222 as needed.

The remote control transceiver 214 performs wireless communication with one or more compatible remote devices, such as a remote control device, a portable computer, an appropriately equipped mobile telephone, or the like. The remote control transceiver 214 enables the user to remotely control various functions of the video services receiver 200, in accordance with well-known techniques and technologies. In certain embodiments, the remote control transceiver 214 is also used to wirelessly receive requests that are related to the display, control, customization, and/or operation of audiovisual exercise segments. For example, the remote control device 113 (see FIG. 1) could be used to configure a user profile 220, to customize one or more audiovisual exercise segments, to enter user performance data or other feedback associated with the completion or performance of physical activity during presentation of an exercise segment, and/or to initiate or terminate the presentation of exercise segments as desired.

Figure 3:
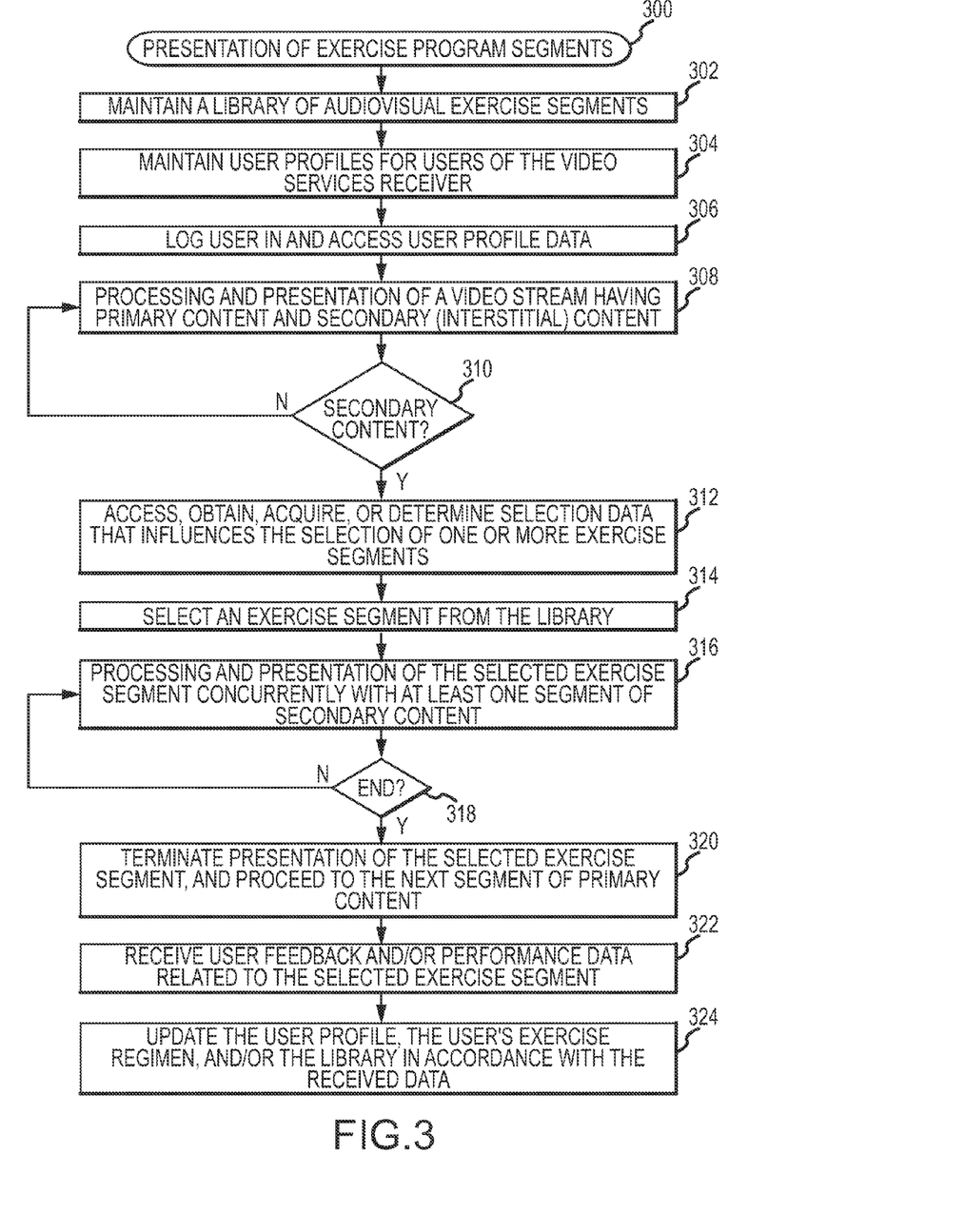
FIG. 3 is a flow chart that illustrates an exemplary embodiment of a method of operating a video services system.

The system 100 (FIG. 1) and the video services receiver 200 (FIG. 2) can be used to selectively present audiovisual exercise segments to a user of the video services receiver 200 during commercial breaks (or at any time between segments of primary audiovisual content). In this regard, FIG. 3 is a flow chart that illustrates an exemplary embodiment of a video services system operating process 300 for the presentation of exercise program segments. The various tasks performed in connection with the process 300 may be performed by software, hardware, firmware, or any combination thereof. For illustrative purposes, the following description of the process 300 may refer to elements mentioned above in connection with FIG. 1 and FIG. 2. In practice, portions of the process 300 may be performed by different elements of the described system, e.g., a DVR module, a processor, a storage element, or the like. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

In accordance with the illustrated embodiment of the process 300, the video services receiver maintains a library of available audiovisual exercise segments (task 302), and maintains one or more user profiles for the users of the video services receiver (task 304). In most applications, the process 300 maintains a plurality of different user profiles corresponding to a plurality of different users. As mentioned above with reference to FIG. 2, each user profile may be associated with an exercise regimen for the respective user, and the library of available audiovisual exercise segments may include any number of exercise segments for use with the exercise regimens.

This example assumes that the video services receiver and the process 300 support multiple users. Accordingly, the process 300 may log the current user in to access the particular user profile data for that user (task 306). Task 306 may be performed to obtain any type or form of user data that identifies the current user of the video services receiver, e.g., user credentials, a numerical code, a username, or the like. This user data may be entered by the user or it may be obtained internally as stored information (such as default user data, the previously entered user data, or the like). In practice, the process 300 may prompt the user to log in whenever the video services receiver is turned on, whenever a channel or service is changed, at the beginning of each day, at any specified time, or in response to the occurrence of any specified event. In certain embodiments, the process 300 keeps the current user logged in until a different user enters his or her user data. This enables the process 300 to access and utilize the user profile for the person who is currently logged in.

The process 300 may continue by processing and presenting a video stream to the user of the video services receiver (task 308), where the video stream includes segments of primary content and secondary content between designated segments of the primary content. A given segment of secondary content may include or convey advertising, marketing, promotional, commercial, or any other content that does not represent a continuation of the primary content. As mentioned above, the video stream intended for presentation may be a live video stream that is being broadcast or otherwise delivered in real-time, or it may be a recorded video stream that is being replayed at the video services receiver.

This example assumes that the video stream includes multiple segments of primary audiovisual content with intervening segments of secondary audiovisual content (e.g., commercials interspersed between program segments). The process 300 determines when a segment of secondary audiovisual content is to be presented (query task 310). The video services receiver can make this determination using any suitable technique or methodology. For example, the video services receiver could analyze the video stream in real-time or in advance for purposes of detecting the presentation of the segment of secondary video content. In certain embodiments, the video services receiver is suitably configured to detect the transition from a segment of primary audiovisual content to a segment of secondary audiovisual content, where such a transition corresponds to the beginning or start time of the segment of secondary audiovisual content. In practice, this type of transition can be detected using one or more of the following techniques, without limitation: detecting changes in audio characteristics; detecting changes in video characteristics; detecting changes in luminance characteristics; detecting the occurrence of blank or black video frames; analyzing closed captioning data; analyzing metadata associated with the video stream; detecting transition markers or flags embedded in the video stream; or the like. It should be appreciated that the foregoing examples are not intended to limit or otherwise restrict the scope or application of the described subject matter, and that the process 300 may utilize any suitable approach that enables the video services receiver to determine when segments of secondary audiovisual content will be presented.

The illustrated version of the process 300 assumes that the video services receiver detects a segment of secondary audiovisual content (the "Yes" branch of query task 310). In response to the detection of the secondary audiovisual content, the process 300 accesses, obtains, acquires, or otherwise determines selection data and criteria that influences the selection of one or more audiovisual exercise segments (task 312). Depending upon the particular embodiment, user preferences, and/or the particular operating conditions, task 312 may perform the selection in accordance with any suitable methodology. For example, the process 300 may acquire or determine a time duration of the segment (or a plurality of segments in sequence) of secondary audiovisual content, and then select an audiovisual exercise segment in accordance with the time duration. In this regard, the process 300 could select one or more exercise segments from the library of available segments, wherein the selected exercise segments represent or convey an exercise regimen having an exercise duration that is less than or equal to the time duration of the detected segment of secondary audiovisual content. In other words, task 312 could be performed such that it selects one or more exercise segments that can be presented during the break between two segments of the primary audiovisual content.

Alternatively or additionally, task 312 may select one or more user-specific audiovisual exercise segments in a manner that is influenced by the user data and/or the user profile of the current user. For example, the user profile for the currently logged in user may specify certain types of exercise content to be presented during commercial breaks, e.g., jumping jacks for one minute, push-ups for one minute, and running in place for thirty seconds. As another example, the user profile for the current user may allow the presentation of exercise content only during certain user-specified times. In this regard, task 312 may select one or more exercise segments from the library based on a current timestamp that indicates the current time of day, the day of the week, the month of the year, the specific date, etc. (where the selection could depend on any piece of information conveyed in the timestamp). As yet another example, the user profile for the current user may block the presentation of exercise content while certain shows or programs (i.e., primary audiovisual content) is being presented. In this manner, task 312 can obtain or retrieve segments of audiovisual exercise content in an intelligent and user-customized manner in accordance with the particular exercise regimen associated with the current user.

Alternatively or additionally, task 312 may select one or more exercise segments based on certain qualities, characteristics, or traits of the primary or secondary audiovisual content. In one exemplary embodiment, the process 300 determines a measure or a metric of physical activity in the primary audiovisual content, and selects the exercise segment(s) in a manner that is influenced by the measure of physical activity. For example, if the primary audiovisual content is a movie or documentary about ballet dancing, then the process 300 might select and retrieve exercise segments that include some form of dancing component. In contrast, if the primary audiovisual content is a slow-paced dramatic movie, then the process 300 might select and retrieve exercise segments that include low-impact activities such as stretching or yoga. The process 300 may also determine or obtain a genre (or any descriptive information) of the primary or secondary audiovisual content, and select the exercise segment(s) in a manner that is influenced by the genre. For example, if the primary audiovisual content is a cartoon for young audiences, then the process 300 might select and retrieve kid-friendly or animated exercise segments. As another example, if the genre of the primary audiovisual content is "Sports", then the process 300 might select and retrieve exercise segments that are intended for athletes. On the other hand, if the genre is "Soap Opera", then the process 300 might select and retrieve exercise segments that are low impact or designed for relaxation. Thus, the subject matter, topic, theme, or focus of the primary or secondary audiovisual content (in an overall global sense or in a segment-by-segment sense) can influence which exercise segments are selected by the process 300.

In practice, the user profile, the content of the primary audiovisual content, the content of the secondary audiovisual content, and/or user preferences may influence or control the format, style, or presentation characteristics of the exercise segments. For example, if the system determines that a child is viewing (e.g., the primary audiovisual content is a program intended for toddlers or young children) then the exercise segments may include audio or video with little to no text-based instructions to contemplate users who cannot read or are learning to read. As another example, a user whose profile indicates that they only recently started to use the exercise feature or just started an exercise regimen may require a more visually rich presentation of what to do and an additional explanation of what muscles they will be using and benefiting initially, but as they use the feature more and become familiar with the terminology, they could move to a different form of content presentation. Thus, the system could dynamically contemplate user progress related to physical fitness with or without additional user profile data and with or without metadata that is descriptive of the primary/secondary audiovisual content.

Eventually, the process 300 identifies and selects an audiovisual exercise segment from the library of available segments (task 314) and initiates presentation of the selected segment of audiovisual exercise content. More specifically, the process 300 presents the selected exercise segment (or segments) concurrently with at least one segment of the secondary audiovisual content (task 316). In other words, the exercise segment is presented in a manner that does not require the termination or deletion of the scheduled secondary audiovisual content. That said, the video services receiver could manipulate or process the secondary audiovisual content if so desired to shift the user's focus to the exercise segment. For example, the secondary audiovisual content could be muted or it could be resized into only a portion of the display screen. In alternative embodiments, the exercise content could be presented in lieu of, before, or after the scheduled secondary content.

Figure 4:
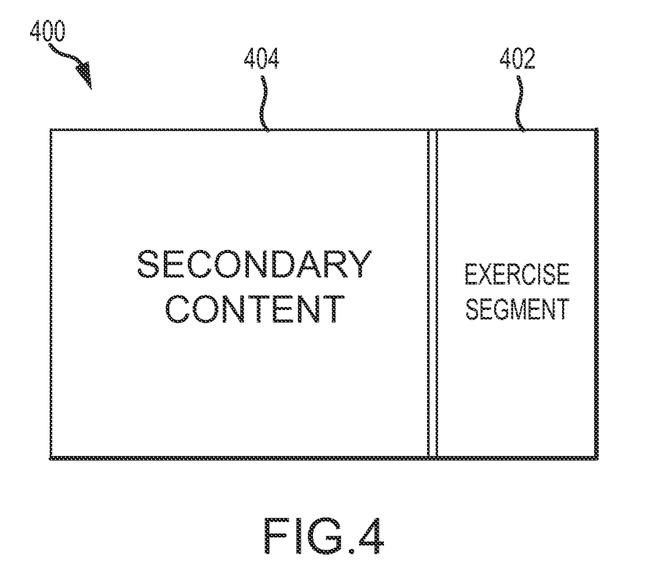
FIGS. 4-7 are diagrams that show several exemplary screen layouts for the presentation of audiovisual exercise segments.
Figure 5:
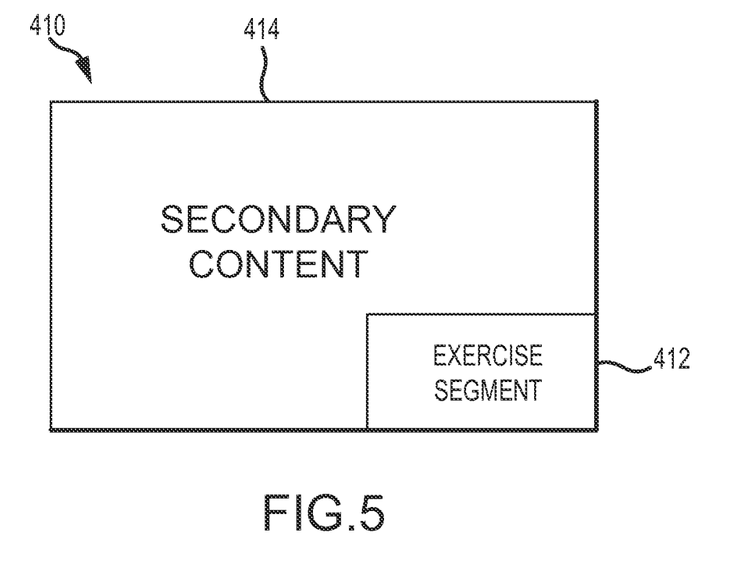
Figure 6:
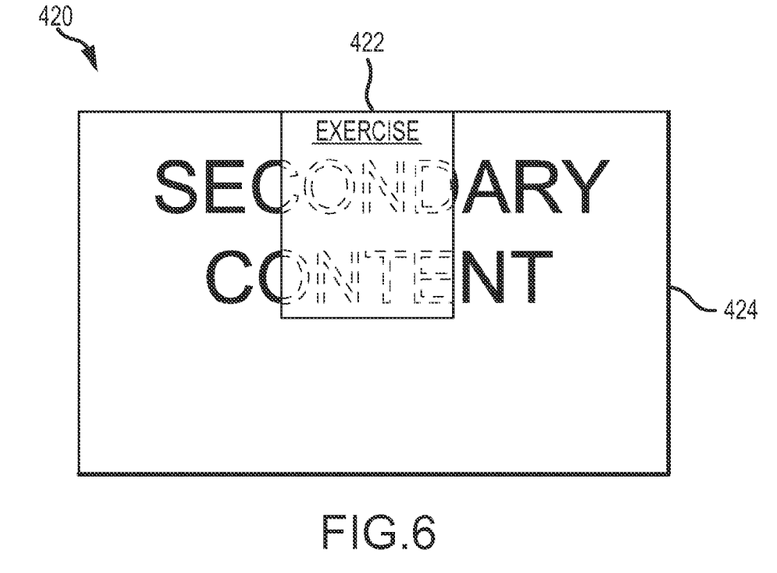
Figure 7:
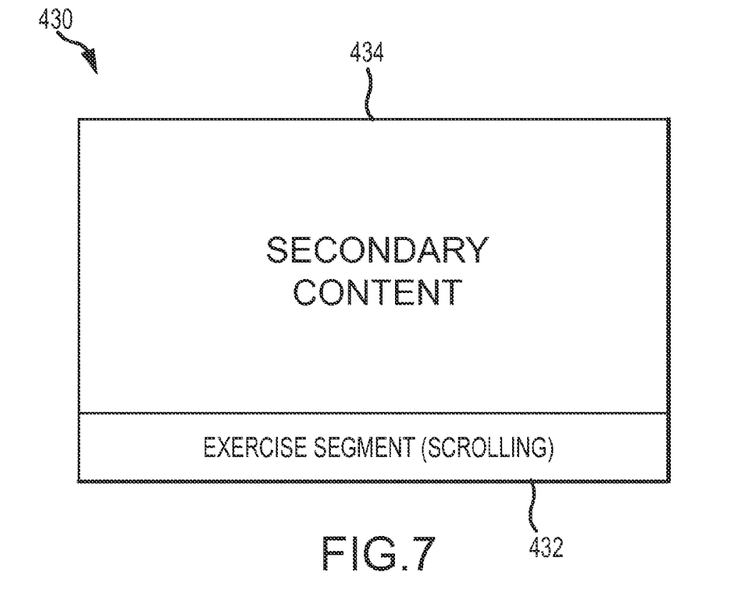

FIGS. 4-7 are diagrams that show several exemplary screen layouts for the presentation of audiovisual exercise segments concurrently with primary audiovisual content. FIG. 4 depicts a split-screen implementation of a display 400 that includes an audiovisual exercise segment 402 presented in one portion of the display 400, and a segment of secondary audiovisual content 404 displayed in another portion of the display 400, with no overlap between the two portions. FIG. 5 depicts a picture-in-picture implementation of a display 410 that includes an audiovisual exercise segment 412 in a picture-in-picture window of the display 410, and a segment of secondary audiovisual content 414 displayed in the primary window of the display 410, with some overlap between the two windows. FIG. 6 depicts a "translucent" overlapping implementation of a display 420 that includes a see-through audiovisual exercise segment 422 that is superimposed over a segment of secondary content 424. The exercise segment 422 is rendered using transparency or translucency effects such that at least some of the underlying secondary audiovisual content 424 remains visible through the exercise segment 422. FIG. 7 depicts a scrolling or ticker tape implementation of a display 430 that includes an audiovisual exercise segment 432 positioned in an unobtrusive location of the display 430. The remainder of the display 430 is devoted to a segment of secondary audiovisual content 434. This particular implementation could be utilized to display the exercise content 432 in a persistent manner that is automatically updated in accordance with the progress of the exercise regimen.

Referring again to FIG. 3, the illustrated embodiment of the process 300 detects an end of the segment of secondary audiovisual content (the "Yes" branch of query task 318) using, for example, any of the techniques and methodologies described above for query task 310. In response to detecting the end of the secondary content, the process 300 terminates the presentation of the current audiovisual exercise segment (if it has not already ended) and proceeds to the next segment of primary audiovisual content (task 320). If the last segment of primary audiovisual content has already been presented, then the process 300 may proceed in an appropriate manner, e.g., by presenting another segment of secondary content, by initiating the presentation of a new video stream, or the like.

This example assumes that the video services receiver can receive and process user feedback related to exercise segments and exercise regimens performed by the user. In this regard, the process 300 may receive user feedback and/or user performance data that indicates an amount of physical activity or exercise completed by the user during the presentation of the exercise segments (task 322). For example, the video services receiver may receive user-entered data that describes or otherwise identifies the number of exercise repetitions (e.g., sit-ups, push-ups, jumping jacks, or bench presses) performed during the last commercial break. As another example, the user performance data may indicate how long the user ran in place during the last exercise segment, how many calories were burned during the last exercise segment, and/or physiological data for the user, such as heart rate, blood pressure, body weight, respiration rate, body temperature, or the like. The received feedback or performance data may be used to update the exercise regimen associated with the user, to update the user's stored profile, and/or to update the library of exercise segments if so desired (task 324). Thus, the user's exercise regimen and/or the specifics of one or more individual exercise segments could be revised to contemplate any ongoing changes in the health or fitness of the user. For example, if the user is consistently performing twenty push-ups and twenty sit-ups during each commercial break, then the user's exercise regimen might be modified to prompt the user to attempt thirty push-ups and thirty sit-ups during the next commercial break. In this way, the system can be dynamically updated in an intelligent manner to address the progress (or lack thereof) of the user from a physical fitness perspective.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a video services system, the method comprising:
    maintaining a library of available audiovisual exercise segments;
    presenting an audiovisual stream to a user of a video services receiver, the audiovisual stream comprising a first segment of primary audiovisual content, a second segment of primary audiovisual content, and a segment of secondary audiovisual content between the first segment of primary audiovisual content and the second segment of primary audiovisual content;
    obtaining user data that identifies the user of the video services receiver;
    acquiring a time duration of the segment of secondary audiovisual content;
    determining a measure of physical activity conveyed in the primary audiovisual content;
    selecting, from the library of available audiovisual exercise segments, a user-specific audiovisual exercise segment, wherein the selecting is influenced by the user data and the time duration, and wherein the selecting is influenced by the measure of physical activity such that the selected user-specific audiovisual exercise segment includes content that is correlated with the measure of physical activity; and
    presenting the selected user-specific audiovisual exercise segment concurrently with the segment of secondary audiovisual content.

2. The method of claim 1, further comprising:
    receiving user performance data that indicates an amount of physical activity completed by the user of the video services receiver during presentation of the selected user-specific audiovisual exercise segment; and
    updating the user data in accordance with the user performance data.

3. The method of claim 1, wherein the segment of secondary audiovisual content comprises advertising, marketing, promotional, or commercial content.

4. The method of claim 1, further comprising:
    detecting an end of the segment of secondary audiovisual content; and
    in response to detecting the end of the segment of secondary audiovisual content, terminating presentation of the selected user-specific audiovisual exercise segment.

5. The method of claim 1, wherein the audiovisual stream is a live audiovisual stream.

6. The method of claim 1, wherein the audiovisual stream is a recorded audiovisual stream.

7. A method of operating a video services system, the method comprising:
    presenting an audiovisual stream to a user of a video services receiver, the audiovisual stream comprising a first segment of primary audiovisual content, a second segment of primary audiovisual content, and a segment of secondary audiovisual content between the first segment of primary audiovisual content and the second segment of primary audiovisual content;
    detecting presentation of the segment of secondary audiovisual content;
    determining a measure of physical activity conveyed in the primary audiovisual content;
    in response to detecting presentation of the segment of secondary audiovisual content, correlating the measure of physical activity with a segment of audiovisual exercise content included in a library of available audiovisual exercise segments;
    obtaining the segment of audiovisual exercise content at the video services receiver; and
    presenting the segment of audiovisual exercise content concurrently with the segment of secondary audiovisual content.

8. The method of claim 7, further comprising:
    in response to detecting presentation of the segment of secondary audiovisual content, acquiring a time duration of the segment of secondary audiovisual content, wherein the obtaining step obtains a segment of audiovisual exercise content that conveys an exercise regimen having an exercise duration that is less than or equal to the time duration of the segment of secondary audiovisual content.

9. The method of claim 7, further comprising:
    maintaining a plurality of user profiles for a plurality of different users of the video services receiver, wherein each of the user profiles is associated with an exercise regimen for a respective one of the different users;
    wherein the obtaining step obtains the segment of audiovisual exercise content in accordance with the exercise regimen associated with the user of the video services receiver.

10. The method of claim 9, further comprising:
    updating the exercise regimen associated with the user of the video services receiver after presenting the segment of audiovisual exercise content.

11. The method of claim 9, further comprising:
    receiving user performance data that indicates an amount of physical activity completed by the user of the video services receiver during presentation of the segment of audiovisual exercise content; and
    updating the exercise regimen associated with the user of the video services receiver in accordance with the received user performance data.

12. The method of claim 7, further comprising:
    maintaining the library of available audiovisual exercise segments; and
    determining a metric associated with physical activity content of the primary audiovisual content;
    wherein the obtaining step comprises selecting the segment of audiovisual exercise content from the library of available audiovisual exercise segments based on the determined metric.

13. The method of claim 7, further comprising:
    maintaining the library of available audiovisual exercise segments; and
    determining a genre of the primary audiovisual content;
    wherein the obtaining step comprises selecting the segment of audiovisual exercise content from the library of available audiovisual exercise segments based on the determined genre.

14. The method of claim 7, further comprising:
    maintaining the library of available audiovisual exercise segments;
    wherein the obtaining step comprises selecting the segment of audiovisual exercise content from the library of available audiovisual exercise segments based on a current timestamp.

15. A video services receiver for providing audiovisual content to a user, the video services receiver comprising:

a receiver interface to receive an audiovisual stream comprising a first segment of primary audiovisual content, a second segment of primary audiovisual content, and a segment of secondary audiovisual content between the first segment of primary audiovisual content and the second segment of primary audiovisual content;

a data storage element to store a library of available audiovisual exercise segments;

a display interface for a display operatively coupled to the video services receiver, the display interface facilitating presentation of the audiovisual stream and segments of audiovisual exercise content on the display; and a processor coupled to the receiver interface, the data storage element, and the display interface, wherein the processor determines a measure of physical activity conveyed in the primary audiovisual content, selects, from the library of available audiovisual exercise segments, a segment of audiovisual exercise content having content that is correlated with the determined measure of physical activity, and initiates presentation of the selected segment of audiovisual exercise content concurrently with the segment of secondary audiovisual content.

16. The video services receiver of claim 15, wherein the processor acquires a time duration of the segment of secondary audiovisual content and selects a segment of audiovisual exercise content that conveys an exercise regimen having an exercise duration that is less than or equal to the time duration of the segment of secondary audiovisual content.

17. The video services receiver of claim 15, wherein:
the processor detects a transition from the first segment of primary audiovisual content to the segment of secondary audiovisual content; and
the processor selects the segment of audiovisual exercise content from the library of available audiovisual exercise segments in response to detecting the transition.

18. The video services receiver of claim 15, wherein the processor selects the segment of audiovisual exercise content from the library of available audiovisual exercise segments based on a user profile of the user.

* * * * *